Patented May 1, 1951

2,551,355

UNITED STATES PATENT OFFICE 2,551,355

DRILLING FLUID

Walter J. Weiss, Rolling Hills Area, Calif., assignor to Texaco Development Corporation, New York, N. Y., a corporation of Delaware No Drawing. Application June 24, 1948, Serial No. 35,061

8 Claims. (Cl. 252—8.5)

This invention relates to drilling muds and the preparation and control of such as employed in the drilling of wells. More specifically, the invention relates to a method of controlling the colloidal and physical properties of drilling mud so as to maintain it in the most desirable condition for use.

Drilling muds or fluids, as they are sometimes called, are used in the drilling of wells for tapping underground collections of oil, gas, brine, or water. Such muds have different functions, the most important of which are to assist in the removal of cuttings from the well, to seal off formations of gas, oil, or water which may be encountered at different levels, to lubricate the drilling tool and the drill pipe which carries the tool, and to hold the cuttings in suspension in event of shutdowns in drilling.

Drilling muds are essentially mixtures of finely divided solids, such as clay and water, usually so compounded that they weigh about 10 pounds per gallon. When found necessary to increase the specific gravity of a particular mud, it is customary to add thereto finely divided materials of high specific gravities, such as iron oxide, barytes, litharge, and the like.

The solid phase of a drilling mud consists of colloidal and non-colloidal particles. The colloidal particles are responsible for the colloidal character of the drilling mud and the existence of such muds as essentially colloidal dispersions. An ideal drilling mud is a thixotropic colloidal system, i. e., a fluid, which on agitation, as by pumping or otherwise, has a relatively low viscosity and is free flowing, but when agitation is stopped, sets or gels. This gel action is sufficiently slow to permit the cuttings to settle two or three feet before the gel structure which is developing during this time is strong enough to support them. As used herein the term "thixotropic drilling mud" is intended to mean a drilling fluid having the proper viscosity, the proper gel rate, and proper gel strength. When such a drilling fluid is circulated through a well bore, it has a sufficiently high viscosity to carry the cuttings and sand from the bottom of the hole to the surface and it has a sufficiently low gelling rate to allow the cuttings and sand to settle in a settling pit. On standing in a quiescent state, it develops sufficient gel strength to prevent the settling of the cuttings, sand, or barytes, etc., in the well bore itself when it becomes necessary to discontinue circulation for any appreciable period of time. Such a mud is also characterized by its ability to form a mud cake on the bore hole wall, thereby assisting in sealing off the traversed formations and inhibiting loss of water from the mud.

The use of a drilling mud which is non-thixotropic is attended by many disadvantages, all of which are well-known to those skilled in the art. Such a mud either develops no gel at all, or gels rapidly enough to remain in a plastic state while in motion. The former condition results in the settling of suspended solids at the bottom of the bore hole during periods of discontinued circulation. On the other hand, a drill fluid which gels too rapidly is difficult to maintain free of cuttings and sand. Such a drilling mud of adequate viscosity at normal circulation rate easily becomes gas cut because of the recirculation of gas bubbles trapped by the rapid-forming gels or flocks. This is particularly dangerous in cases where a bore hole traverses or encounters high gas pressures because the gas cutting of the mud may so reduce the hydrostatic head of the drilling mud in the bore hole as to result in the blowing out of the well.

Drilling muds are generally prepared by suspending clays in water, those clays being selected which will yield thixotropic colloidal systems. Such clays contain in varying amounts complex colloidal alumino-silicates which are essentially acids whose anion is a micell of the general formula,

$$X(Al_2O_3) - Y(SiO_2) - Z(H_2O)$$

where X is approximately 1, Y is approximately 3, and Z may vary over wide values.

Although drilling fluids having various thixotropic properties may be prepared by the use of suitable clays, these desirable properties are lost in varying degrees during the penetration of certain shales, clays, and water-bearing formations. Such deterioration may involve the conversion of a monovalent ion clay into an acid clay or a multivalent ion clay. The former occurs when the thixotropic drilling mud encounters acid strata; the latter, which is the most common, occurs when the drilling mud encounters strata of calcium and magnesium clays or soluble compounds. Under such circumstances a phenomenon known as base exchange occurs whereby the monovalent ion clays are converted into multivalent ion clays and thereby rendered more sensitive to flocculating impurities.

Flocculation or coagulation of any of the types of clays by flocculation materials such as salt encountered during drilling and the rapid accumulation of colloidal matter from penetrated shales or clays increases the viscosity of the mud and its gel strength undesirably. Dilution of the mud with water, a frequently attempted remedy, is particularly undesirable if high gas pressures are encountered, since the specific gravity of the fluid is thereby lowered and more gas permitted to enter the well bore.

In drilling fluids containing starch, the preservation of the starch and similar compounds against spoilage is important since any deterioration of the starch in the mud materially reduces the beneficial effect of the starch.

It is an object of the present invention to provide a drilling mud which possesses the aforesaid desirable thixotropic properties at the beginning of its use and is capable of retaining those properties in substantially the original degree during use, regardless of the type strata encountered in the drilling.

Another object of the invention is the provision of a compound capable of preserving any added starch content of a mud against turning sour.

A further object of the invention is the provision of a novel method of drilling wells coupled with the use of a fluid capable of retaining substantially the same desirable characteristics throughout the entire operation.

Further objects and advantages of the present invention will appear from the following description and attached claims.

In its broader aspect, the invention involves the use of complex alkali metal heavy metal polyphosphates or reactants which go to make such complexes in drilling muds. More specifically, the invention involves the use of such complexes as are effective in preserving the starch content of drilling muds and preventing it from turning sour.

In describing the invention, reference is first made to a known complex metal polyphosphate, namely, sodium cupric pyrophosphate, which is available commercially. This compound is considered to be of the probable formula $Na_2CuP_2O_7$. This particular compound when tested in a typical drilling mud such as 1:1 Rogers Lake-McKittrick light stock was found to be an effective viscosity reducing agent. This mud was formed of equal parts by weight of McKittrick light drilling mud clay and Rogers Lake drilling mud clay mixed with tap water to a 600 R. P. M. 77° F. Stormer viscosity of about 50 centipoises. The mud had a starch content of 12 lb. per A. P. I. bbl. (42 gallons) and was allowed to incubate at 130° to 140° F. over a 14 day period. The following table indicates the results obtained, the indicated viscosities being measured in centipoises at 600 R. P. M. at 77° F. on a Stormer-type viscosimeter wherein changes had been made to improve the control of the times and rates of rotation.

| #$Na_2CuP_2O_7$ per A. P. I. bbl. (42 gal.) | Viscosity | | | |
|---|---|---|---|---|
| | Original | Highest | Lowest | At end of 14 day test period |
| Untreated mud | 68 | 97+ | 68 | (¹) |
| ⅛# | 60 | 61 | 34 | 34 |
| ¼# | 51 | 54 | 45 | 45 |
| ½# | 46 | 53 | 44 | 53 |
| 1# | 45 | 51 | 45 | 51 |
| 2# | 43 | 46 | 40 | 40 |

¹ 97 on 7th day and rising.

The same agent has given excellent results with regard to water loss as measured in cc. per hour on a multiple cell filter press using paper as a filter base, operating at 100 p. s. i. having a filter area approximately the same as the A. P. I. 100 lb. filter cell, and giving approximately the same filtration values as the A. P. I. 100 lb. press. An untreated mud, having an initial water loss of about 3.5 cc./hour, became sour and showed a water loss of 6.5 cc./hour between the 7th and 8th day of the test period with the rate of water loss rising. The same mud treated with ½ lb./A. P. I. bbl. of sodium cupric pyrophosphate showed no increase in fluid loss up to the 14th day and did not reach a 6 cc./hr. loss until the 28th day of the test period. With 1 lb./A. P. I. bbl., there was no increase in fluid loss during the first 14 days and on the 28th day was less than 5 cc./hr.

While this commercial sodium cupric pyrophosphate appeared to be relatively insoluble in water, the addition of ammonium hydroxide rendered the insoluble material more soluble and gave the intense dark blue color similar to that characteristic of the copper ammonium complex ion. This soluble product was tested as both a viscosity reducing agent and a starch mud preservative. Its efficiency in either respect did not appear to be affected.

However, the additional use of the ammonium hydroxide has been found to be advantageous. In the use of starch-containing drilling muds, even though preservatives are used, there seems to be a small amount of starch deterioration, which liberates acidic materials. This tends to lower the pH of the mud over a period of time. In one case, the manufacturer of a commercial preservative recommends holding the pH of the mud between 8.3 and 9.0 by the use of caustic soda. The use of caustic soda with a conventional copper preservative results in the precipitation of the copper as copper hydroxide which causes the mud to sour immediately. This is not the case when ammonium hydroxide is used.

The use of ammonium hyroxide for pH control is also advantageous in that it affords a convenient and reliable method for maintaining the desired stable pH range outside the zone of greatest bacterial activity which is at a pH between 6 and 8. Any pH above or below this zone tends to suppress any rank bacterial growth.

Substantially equally good results in the reduction of viscosities of drilling muds have been secured by charging such muds with the reaction products of approximately stoichiometrical portions of a polyphosphate selected from the left column of the following table and a metal compound selected from the right column:

| Polyphosphates | Heavy Metal Compounds |
|---|---|
| Sodium tetraphosphate, $Na_6P_4O_{13}$ | $CuSO_4$, $CuCO_3Cu(OH)_2$ Malachite |
| Sodium triphosphate, $Na_5P_3O_{10}$ | $AgNO_3$, $Pb(NO_3)_2$ |
| Sodium hexametaphosphate, $Na_6P_6O_{18}$ | $HgCl_2$, $MnSO_4.4H_2O$ |
| Sodium pyrophosphate, $Na_4P_2O_7$ | $CdSO_4$, $CrCl_3$ |
| Disodium dihydrogen pyrophosphate, $Na_2H_2P_2O_7$ | $NiCl_2$, $CoCl_2.6H_2O$ |
| | $SnCl_2.2H_2O$ |
| | $FeCl_3$, Titanium Potassium Oxalate |
| | $FeSO_4.7H_2O$ |

While the sodium salts have been listed, it is to be understood that any of the salts of alkali metals including potassium, lithium, and ammonium, where sufficiently stable may be used. The term alkali metal as used herein is intended to include the ammonium radical in such compounds. Likewise the various metals listed in the right column may be used in combination with anions other than those listed, providing that no seriously detrimental or harmful reaction products are formed. The listed compounds are cited only as examples of some of the possible reactants. It will be noted that the metals listed above are heavy metals as defined in Hackh's Chemical Dictionary, third edition.

The following are listed as examples of known or possible reactions wherein the desired reaction products are secured, the character M representing the metal in a bivalent form. It is to be understood that the equations can also be written for such metals of other valences:

(1) $Na_4P_2O_7 + MSO_4 \rightarrow Na_2MP_2O_7 + Na_2SO_4$
(2) $Na_2H_2P_2O_7 + MSO_4 \rightarrow Na_2MP_2O_7 + H_2SO_4$
(3) $Na_6P_4O_{13} + MSO_4 \rightarrow Na_4MP_4O_{13} + Na_2SO_4$
(4) $Na_6P_4O_{13} + 2MSO_4 \rightarrow Na_2M_2P_4O_{13} + 2Na_2SO_4$
(5) $Na_6P_6O_{18} + MSO_4 \rightarrow Na_4MP_6O_{18} + Na_2SO_4$
(6) $Na_6P_6O_{18} + 2MSO_4 \rightarrow Na_2M_2P_6O_{18} + 2Na_2SO_4$
(7) $Na_5P_3O_{10} + MSO_4 \rightarrow Na_3MP_3O_{10} + Na_2SO_4$
(8) $Na_5P_3O_{10} + 2MSO_4 \rightarrow NaM_2P_3O_{10} + 2Na_2SO_4$
(9) Neutralization of meta and pyrophosphoric acids with varying amounts of metal carbonates, oxides, hydroxides, or mixtures thereof, to yield intermediate metallic acid salts together with sufficient quantities of basic alkali metal compounds.

Of the above, Equations 1, 3, 6, 7, and 9 are recognized reactions. Equation 2 is open to question as being exactly as represented since the reactions of Equations 1 and 2 with the same metallic salt sometimes give slurries of somewhat different solubilities. This may be only a pH effect due to the acid nature of the sodium acid pyrophosphate.

Equation 4 appears to be a sequestering reaction and in Equation 5 a partial saturation of the $Na_2(Na_4(PO_3)_6)$ formula may be correct or the reaction product may consist of a mixture of $Na_2M_2P_6O_{18}$ and unreacted $Na_6P_6O_{18}$.

Equation 8 is a possible reaction which could result in the formation of an equimol mixture of the neutral salt $M_5P_6O_{20}$ with the sequestering reaction product $Na_3MP_3O_{10}$.

In the experimental work, the reaction products shown below (some perhaps hypothetical but nevertheless effective) were produced from the reactants indicated:

$Na_2CuP_2O_7$ (from 9.38 g. $Na_4P_2O_7$ and 8.80 g. $CuSO_4.5H_2O$)
$Na_3CuP_3O_{10}$ (from 9.54 g. $Na_5P_3O_{10}$ and 6.48 g. $CuSO_4.5H_2O$)
$Na_2Cu_2P_4O_{13}$ (from 9.30 g. $Na_6P_4O_{13}$ (Quadrafos) and 9.88 g. $CuSO_4.5H_2O$)
$Na_2Cu_2P_6O_{18}$ (from 9.46 g. $Na_6P_6O_{18}$ (Calgon) and 7.70 g. $CuSO_4.5H_2O$)
$Na_2CuP_2O_7$ (from 6.28 g. $H_4P_2O_7$, 3.90 g. $CuCO_3.Cu(OH)_2$, and 1.87 g. $Na_2CO_3$)
$Na_2HgP_2O_7$ (from 6.32 g. $Na_4P_2O_7$ and 6.42 g. $HgCl_2$)
$Na_4HgP_4O_{13}$ (from 7.53 g. $Na_6P_4O_{13}$ (Quadrafos) and 4.35 g. $HgCl_2$)
$Na_2NiP_2O_7$ (from 9.54 g. $Na_4P_2O_7$ and 8.53 g. $NiCl_2.6H_2O$)
$Na_2Ag_4P_4O_{13}$ (from 5.81 g. $Na_6P_4O_{13}$ (Quadrafos) and 8.39 g. $AgNO_3$)
$Na_2CdP_2O_7$ (from 6.68 g. $Na_2H_2P_2O_7$ and 6.27 g. $CdSO_4$)
$Na_2Cd_2P_6O_{18}$ (from 8.22 g. $Na_6P_6O_{18}$ (Calgon) and 5.59 g. $CdSO_4$)
$Na_3FeP_6O_{18}$ (from 10.22 g. $Na_6P_6O_{18} + 2.70$ g. $FeCl_3$)
$Na_2Fe_2P_6O_{18}$ (from 9.69 g. $Na_6P_6O_{18} + 8.79$ g. $FeSO_4.7H_2O$)
$Na_2Pb_2P_6O_{18}$ (from 6.55 g. $Na_6P_6O_{18} + 7.08$ g. $Pb(NO_3)_2$)
$Na_2Mn_2P_6O_{18}$ (from 9.72 g. $Na_6P_6O_{18} + 7.07$ g. $MnSO_4.4H_2O$)
$Na_3CrP_6O_{18}$ (from 10.29 g. $Na_6P_6O_{18} + 2.66$ g. $CrCl_3$)
$Na_2Co_2P_6O_{18}$ (from 9.59 g. $Na_6P_6O_{18} + 7.29$ g. $CoCl_2.6H_2O$)
$Na_2Sn_2P_6O_{18}$ (from 8.66 g. $Na_6P_6O_{18} + 5.93$ g. $SnCl_2.2H_2O$)
$Na_2Ti_2P_6O_{18}$ (from 9.94 g. $Na_6P_6O_{18} + 11.48$ g. titanium potassium oxalate)

In each case, the theoretical amounts of polyphosphate and metal salts which would react to form 10 grams of the complex were used. The polyphosphate was dissolved or suspended in 80 to 90 ml. distilled water, the metal salt added and the mixture shaken until the reaction appeared to be complete. Distilled water was added to bring the volume up to 100 ml., all chemical additions thereafter being based on the premise that 100 ml. of the solution or slurry contained 10 grams of the desired reaction product, i. e., the complex.

There is definite proof that the reaction products in each case include complex alkali metal heavy metal polyphosphates or possess the characteristics thereof.

Selecting Equation 1 by way of example and using the amounts of reactants indicated, the following equation is secured:

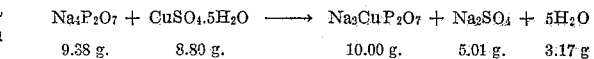

$Na_4P_2O_7 + CuSO_4.5H_2O \longrightarrow Na_2CuP_2O_7 + Na_2SO_4 + 5H_2O$
9.38 g.    8.80 g.        10.00 g.    5.01 g.    3.17 g If there was no reaction, the final 100 ml. of mixture would contain only 9.38 gms. of tetrasodium pyrophosphate and 8.80 grams of copper sulfate. At high chemical concentrations, this tetrasodium pyrophosphate will overload the starch mud, and the copper sulfate, even at low concentrations, will cause severe flocculation of the mud. Neither occurred. On the contrary, mud having a viscosity of 51.9 cp. as indicated in the following table was reduced in viscosity to 13.0 cp. by the use of 0.5 gram of the hypothetical (or actual) complex per 100 ml. of stock mud. This is believed to clearly indicate the formation of the complex.

Assuming the reaction to go as shown, the final 100 ml. of solution contains 10 grams of $Na_2CuP_2O_7$ and 5.01 grams of sodium sulfate. Sodium sulfate is notoriously detrimental to stock mud and causes flocculation thereof even at very nominal concentrations. However such flocculation does not occur with this reaction product. It is therefore considered that while the reaction products as indicated above may have been formed, the complex polyphosphate is a sufficiently powerful viscosity reducing agent to offset the detrimental effects of the other reaction product such as sodium sulfate.

The same conditions can be illustrated with the other reactions.

All the above actual products or reaction mixtures were tested to determine their effect on the viscosity of a 1:1 Rogers Lake-McKittrick light stock mud at 600 R. P. M. and 77° F. in a Stormer-type viscosimeter. No starch was used in the mud. The results are reported in the following table.

| Compound | Stormer Viscosity at 600 R. P. M. and 77° F. Grams of Chem. (dry basis) per 100 ml. of Stock Mud | | | | |
|---|---|---|---|---|---|
| | Untreated | 0.010 | 0.050 | 0.100 | 0.500 |
| | Cp. | Cp. | Cp. | Cp. | Cp. |
| $Na_2CuP_2O_7$ [1] | 51.9 | 44.2 | 28.0 | 20.6 | 18.0 |
| $Na_3CuP_3O_{10}$ | 50.1 | 44.9 | 27.1 | 25.3 | 17.3 |
| $Na_2Cu_2P_4O_{13}$ | 40.3 | 37.8 | 21.9 | 22.2 | 14.3 |
| $Na_2Cu_2P_6O_{18}$ | 45.2 | 42.9 | 33.9 | 29.5 | 17.3 |
| $Na_2CuP_2O_7$ [2] | 44.8 | 42.6 | 25.8 | 20.7 | 17.8 |
| $Na_2HgP_2O_7$ | 51.9 | 47.7 | 30.5 | 25.5 | 17.0 |
| $Na_4HgP_4O_{13}$ | 44.1 | 39.8 | 30.9 | 25.5 | 16.8 |
| $Na_2NiP_2O_7$ | 54.6 | 45.9 | 27.6 | 24.1 | 21.0 |
| $Na_4Ag_4P_4O_{13}$ | 45.0 | 43.2 | 31.8 | 26.3 | 17.5 |
| $Na_2CdP_2O_7$ | 41.6 | 39.6 | 28.7 | 23.9 | 15.7 |
| $Na_2Cd_2P_6O_{18}$ | 48.5 | 46.3 | 37.7 | 35.0 | 28.0 |
| $Na_3FeP_6O_{18}$ | 53.0 | 49.8 | 37.4 | 32.8 | 21.0 |
| $Na_2Fe_2P_6O_{18}$ | 53.0 | 49.8 | 38.0 | 33.0 | 23.7 |
| $Na_2Pb_2P_6O_{18}$ | 54.8 | 53.4 | 47.2 | 42.4 | 30.5 |
| $Na_2Mn_2P_6O_{18}$ | 54.8 | 53.2 | 45.6 | 39.2 | 35.3 |
| $Na_3CrP_6O_{18}$ | 48.8 | 44.7 | 36.0 | 31.3 | 24.8 |
| $Na_2Co_2P_6O_{18}$ | 48.8 | 47.0 | 39.3 | 31.5 | 29.7 |
| $Na_2Sn_2P_6O_{18}$ | 50.8 | 48.2 | 36.4 | 36.8 | 26.5 |
| $Na_2Ti_2P_6O_{18}$ | 50.8 | 46.6 | 38.2 | 36.1 | 40.6 |

[1] From $Na_4P_2O_7$ and $CuSO_4 \cdot 5H_2O$.
[2] From $H_4P_2O_7$, $CuCO_3 \cdot Cu(OH)_2$, and $Na_2CO_3$.

The above clearly indicates the high efficiency of the reaction products in controlling the viscosity of the drilling mud.

To summarize, it will be noted that the reactants are mixed in approximately the proper stoichiometric proportions and the reaction products charged to the drilling mud. In some cases, it may be possible to charge the reactants directly to the mud in the desired proportions and form the reaction products directly therein. Preforming prior to charging is preferred because of the ability to better observe and control the reaction. The phrase "approximately stoichiometric proportions" as used herein is intended to include those proportions whereby the desired complex metal polyphosphate is formed such as $Na_2CuP_2O_7$, $Na_4Ag(P_2O_7)_3$ and $K_8Hg(P_2O_7)_3$. This usually necessitates the use of a slight excess of the alkali metal polyphosphate which apparently functions to dissolve the otherwise insoluble polyphosphates and enables the production of the metal complexes.

When the polyphosphate and the selected metal compound are mixed prior to charging to the drilling mud, a slurry is sometimes formed. This slurry may be charged to the drilling mud as is. However, in some cases it has been found that sufficient ammonia can be added to render the mixture clearer, the precipitate or suspension apparently being rendered more water-soluble. Whether the ammonia enters into the products of the initial reaction, thereby rendering them more complex or whether the ammonia functions only to effect dissolution of the solids is unknown. The advantages of adding ammonium hydroxide have already been discussed.

It has also been found that some of the complexes disclosed herein, such as the copper, silver, mercury and nickel complexes, are particularly valuable as starch (pre-gelatinized) mud preservatives. Cadmium complexes have also been effective. By way of example, about 1 lb. of commercial sodium cupric pyrophosphate was added to an A. P. I. bbl. (42 gals.) of starch mud and the sample incubated with an untreated blank of the same mud. The untreated sample soured in eight days whereas the treated sample was still sweet after a period of two weeks. In another test involving a 1 bbl. mix of a 12#/A. P. I. bbl. starch-containing mud, the mud was still sweet after being run for 6 weeks, 24 hours per day, in a pilot scale, mud circulation system. The preservation of the starch is particularly desired to preserve the low filtration rate (water-loss) of the mud. All the aforementioned complexes are substantially as effective as the sodium cupric pyrophosphate already discussed.

From the preservative tests conducted thereon, it is believed these complexes function best when charged initially in relatively large amounts supplemented by small charges at regular intervals. This method can be termed a "quick kill" method. This is particularly true in the case of the copper and nickel complexes. The mercury and silver complexes exhibit more sustained killing effect and are effective at lower concentrations. This is believed due not only to a higher degree of toxicity of the mercury-and-silver-containing complex ions but also to the fact that the ions may not be as effectively adsorbed by the clay micelle.

In all cases, it is desirable to use a continual treating method. Small percentages of the compounds added initially do not appear to be effective as preservatives. It is desirable that an amount in excess of 0.5 lb. (dry weight) per A. P. I. bbl. of mud be used initially for an initial "quick kill" effect. This is in excess of 0.15% by weight of the total weight of the mud stream. Later and periodic charges are added to continue the treatment. An initial charge of 1 to 3 lbs. per bbl. followed by 1/9 lb. per tour (8 hr. shift) per bbl. of starch mud has been found satisfactory in pilot runs.

Thus the single complex has been found to perform a dual function, the last named function, i. e., the preservation function, being performed without the addition of any chemical other than the complex required to accomplish the first function, i. e., desired viscosity reduction.

The amount of agent or additive added to a particular mud depends upon numerous factors such as the type of mud, the amount of improvement or the degree of protection that is desired in the drilling mud, and the conditions likely to be encountered. It has been found, however, that in most cases an amount within the range of 0.01% to 1.00% by weight will produce the desired result. Overloading may occur in some cases at the higher value and it may be necessary to lower the top limit for those cases to 0.50%.

For preservative control, an amount in excess of 0.5 lb. per A. P. I. barrel of starch mud has usually been found necessary. It has been found preferable to charge initially from 1 to 3 lbs. per barrel followed by lesser amounts at intervals throughout the period of use.

The invention may be practiced in a number of different ways. The drilling mud may be prepared by incorporating the desired amount of agent directly in a suspension of clay in water, or the requisite amount may be added to a drilling mud which is flocculated in order to reduce its viscosity to a value at which the mud can be used most effectively. The agent may also be continuously added to a drilling mud during use to prevent any substantial change in its colloidal and physical characteristics.

It is to be understood that the complex polyphosphates disclosed herein as starch preservatives can be used also as recovery agents, i. e., they can be added to a sour mud to preserve the starch content thereof against further deterioration. In one case where a 12 lb. per A. P. I. bbl. starch mud had soured to an extent to raise the viscosity from about 60 cp. to about 77 cp. in three days, the addition of only 1 lb. of sodium cupric pyrophosphate per A. P. I. bbl. on the third day controlled the viscosity so that it reached only about 81 cp. after 11 more days. Even better control could have been secured had the initial charge been followed by smaller charges at regular intervals.

While the term "reaction products" used herein is intended primarily to include the complex reaction product, such as sodium cupric pyrophosphate, it is also intended to include any other of the reaction products that may contribute to the improved results obtained.

The compounds disclosed and claimed herein which are complex alkali metal heavy metal polyphosphates are to be distinguished from the heavy metal polyphosphates disclosed and claimed in applicant's co-pending application Serial No. 35,062, filed June 24, 1948.

Obviously many modifications and variations of the invention as above set forth may be made without departing from the spirit and scope thereof, and therefore only such limitations should be imposed as are indicated in the appended claims.

I claim:

1. An aqueous drilling fluid containing reaction products in aqueous solution of an alkali metal polyphosphate and a compound containing a heavy metal ion selected from the group consisting of titanium, chromium, manganese, iron, cobalt, cadmium, tin and lead, in amounts sufficient to control the viscosity of the fluid, said compounds being used in approximately stoichiometric proportions to form a complex alkali metal heavy metal polyphosphate.

2. An aqueous drilling fluid containing reaction products in aqueous solution of an alkali metal pyrophosphate and a compopund containing a heavy metal selected from the group consisting of titanium, chromium, manganese, iron, cobalt, cadmium, tin and lead, in amounts sufficient to control the viscosity of the fluid, said compounds being used in approximately stoichiometric proportions to form a complex alkali metal heavy metal pyrophosphate.

3. An aqueous drilling fluid containing reaction products in aqueous solution of an alkali metal polyphosphate, a compound containing a heavy metal ion selected from the group consisting of titanium, chromium, manganese, iron, cobalt, cadmium, tin, and lead, and ammonia, the latter being present in sufficient amount to control the pH of the fluid, said polyphosphate and metal compound being used in approximately stoichiometric proportions to form a complex alkali metal heavy metal polyphosphate, said polyphosphate being added in an amount sufficient to control the viscosity of the fluid.

4. An aqueous drilling fluid containing reaction products in aqueous solution of an alkali metal polyphosphate and a compound containing a heavy metal selected from the group consisting of titanium, chromium, manganese, iron, cobalt, cadmium, tin and lead, in amounts sufficient to control the viscosity of the fluid, said compounds being caused to react in an excess of polyphosphate over the stoichiometric requirement to form a complex alkali metal heavy metal polyphosphate.

5. In the art of drilling wells by the employment of an aqueous drilling fluid, the process comprising the addition to the drilling fluid of the reaction products in aqueous solution of an alkali metal polyphosphate and a compound containing a heavy metal selected from the group consisting of titanium, chromium, manganese, iron, cobalt, cadmium, tin, and lead in amounts sufficient to control the viscosity of the fluid, said polyphosphate and said metal compound being used in approximately stoichiometric proportions to form a complex alkali metal heavy metal polyphosphate.

6. In the art of drilling wells by the employment of an aqueous drilling fluid, the process comprising the addition to the drilling fluid of the ammonia-treated reaction products in aqueous solution of an alkali metal polyphosphate and a compound containing a heavy metal selected from the group consisting of titanium, chromium, manganese, iron, cobalt, cadmium, tin and lead, ammonia being present in sufficient amount to control the pH of the fluid, said polyphosphate and said metal compound being used in approximately stoichiometric proportions to form a complex alkali metal heavy metal polyphosphate, said polyphosphate being added in an amount sufficient to control the viscosity of the fluid.

7. In the art of drilling wells by the employment of an aqueous drilling fluid, the process comprising the addition to the drilling fluid of reaction products in aqueous solution of an alkali metal polyphosphate and a compound containing a heavy metal selected from the group consisting of titanium, chromium, manganese, iron, cobalt, cadmium, tin and lead, said compounds being used in approximately stoichiometric proportions to form a complex alkali metal heavy metal polyphosphate, said reaction products being initially charged in a relatively large amount and subsequently charged at periodic intervals in relatively small amounts sufficient to control the viscosity of the fluid.

8. The process of claim 7 wherein said reaction products are initially charged in an amount in excess of 0.5 pound (dry weight) per A. P. I. barrel of fluid.

WALTER. J. WEISS.

REFERENCES CITED

The following references are of record in the file of this patent:

UNITED STATES PATENTS

| Number | Name | Date |
|---|---|---|
| 2,235,955 | Williams | Mar. 25, 1941 |
| 2,294,877 | Wayne | Sept. 1, 1942 |
| 2,324,124 | Williams | July 13, 1943 |
| 2,365,489 | Partridge | Dec. 19, 1944 |
| 2,370,472 | King | Feb. 27, 1945 |
| 2,414,647 | Hoeppel | Jan. 21, 1947 |
| 2,417,307 | Larsen | Mar. 11, 1947 |